United States Patent
Boursier et al.

[11] Patent Number: 5,910,815
[45] Date of Patent: *Jun. 8, 1999

[54] TELEPHONE SET

[75] Inventors: Alain Boursier; Louis Giron, both of Le Mans, France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/523,838

[22] Filed: Sep. 6, 1995

[30] Foreign Application Priority Data

Sep. 13, 1994 [FR] France .................................. 94 10908

[51] Int. Cl.⁶ ...................................................... H04N 7/14
[52] U.S. Cl. ............................ 348/14; 348/15; 379/93.17
[58] Field of Search ........................... 379/53, 54, 93.17, 379/110.01; 348/14, 17, 18, 20; 455/556, 557

[56] References Cited

U.S. PATENT DOCUMENTS 4,928,300  5/1990  Ogawa et al. ............................. 348/14
5,189,632  2/1993  Paajanen ............................. 364/705.05
5,396,269  3/1995  Gotoh et al. ............................... 348/14
5,485,504  1/1996  Ohnsorge ................................. 455/566
5,528,285  6/1996  Morikawa et al. ......................... 348/14
5,579,239  11/1996  Freeman et al. ......................... 364/514

FOREIGN PATENT DOCUMENTS 62-091045  4/1987  Japan ............................ H04M 1/100
62-91045   4/1987  Japan .
2044982    8/1988  Japan .
4237287    1/1991  Japan .
6268582    3/1993  Japan .
670312     3/1994  Japan .

*Primary Examiner*—Paul Loomis
*Assistant Examiner*—Melur. Ramakrishnaiah
*Attorney, Agent, or Firm*—Jack D. Slobod

[57] ABSTRACT

The telephone set comprises a base (27) which can be connected to a telephone line, and a handset (28) which includes speech circuits which are connected to the telephone line via the base. The telephone set further comprises a casing (17 or 28) which includes a picture sensor (31 or 1) producing a picture signal, and a screen (32 or 19) forming a viewfinder. The use of the casing is analogous to the use of a photo camera. The picture is digitized, then stored and transmitted to the base to be transmitted by facsimile.

11 Claims, 1 Drawing Sheet

TELEPHONE SET

FIELD OF THE INVENTION

The present invention relates to a telephone set comprising a part intended for transmitting/receiving signals, connected to a telephone line, a part contained in a detachable casing, which includes audio signal processing means, and communicating with the part connected to the telephone line, a detachable part with a picture sensor and, in the part connected to the telephone line, means for transmitting a picture over the telephone line.

The invention relates to telephones in general, for example, conventional telephones with or without a cord between the handset and the base.

BACKGROUND OF THE INVENTION

Telephone sets with transmission of a picture over a telephone line, called videophones, comprising elements that correspond to the preamble mentioned above are known, for example, from the document Patent Abstracts of Japan relating to Patent A62091045 (NEC CORP) It relates to a videophone which transmits to each party the picture of the other. The transmitted picture has of necessity a very limited definition owing to the limited passband.

SUMMARY OF THE INVENTION

It is an object of the invention to provide new possibilities for a telephone set.

To this end, the detachable part including the picture sensor comprises a converter for digitizing the picture signal coming from the sensor and a picture memory for locally storing at least one complete digitized picture, and the part connected to the telephone line has a specialized link to the detachable part which includes the picture sensor for the delayed transmission of a still picture from the detachable part which includes the picture sensor to the part connected to the telephone line, and means for transmitting such a still picture over the telephone line.

In this manner the detachable part which includes the picture sensor can be utilized exactly like a digital photo camera when photographs are taken, after which the picture with all its details can be transmitted to the other party. The transmission of a picture and the transmission of a telephone message are effected completely separately.

The basic idea of the invention is to couple as it were a digital photo camera and a telephone to be able to transmit directly and in a simple manner the photographs taken with the photo camera.

In an advantageous embodiment the detachable part which includes the picture sennsor is accommodated in a second detachable casing separate from the casing accommodating the part which includes audio signal processing means.

In this manner the telephone can customarily be used by one person while another person uses the picture sensor and may even set out on a journey with it.

Advantageously, the picture memory of the detachable part which includes the picture sensor has a capacity of several pictures, and the telephone set comprises means for selecting a picture from various pictures in the picture memory of the detachable part which includes the picture sensor.

Thus it is possible to store various still pictures in a row as with a photo camera and examine them at leisure at a later stage.

In an advantageous embodiment, the part connected to the telephone line includes a screen and means for storing and displaying on this screen a still picture extracted via said special link from the picture memory of the detachable part which includes the picture sensor.

One may thus check and select the picture one wishes to transmit from various pictures that have previously been taken.

Advantageously, the part connected to the telephone line comprises means for transmitting over the telephone line a picture, coming from the detachable part which includes the picture sensor, in the standard form of a facsimile message.

Thus the number of persons likely to receive a still picture taken by the detachable part which includes the picture sensor is large because, actually, a large number of persons have a facsimile receiver.

The part connected to the telephone line furthermore advantageously includes means for storing and displaying on its screen a still picture extracted via the telephone line from the picture memory of the detachable part which includes the picture sensor of another telephone set of the same type.

In this manner one has an alternative for the customary reception of a picture via facsimile, that is to say, the direct display of a picture received from another party. Furthermore, the set has dimensions which are reduced relative to those of a conventional telecopier, because it does not of necessity comprise means for scrolling a sheet of paper.

Advantageously, the detachable part which includes the picture sensor includes a display screen which displays, as desired, either in real time the picture picked up by the sensor, or a picture coming from the memory.

This screen can thus either perform the role of a view finder of a photo camera, or make it possible to check locally the recorded pictures with only the detachable part which includes the picture sensor.

Advantageously, the part connected to the telephone line has a display screen with a higher definition than the definition of the viewfinder.

Thus, a picture can be examined by means of the part connected to the telephone line under better conditions than with only the detachable part which includes the picture sensor.

The telephone set furthermore advantageously comprises means, in addition to the telephone line, for transmitting a still picture from the detachable part which includes the picture sensor to an external apparatus.

Thus it is possible if, for example, the external apparatus is a printer, to obtain immediately a picture on paper. It is also possible to transmit the picture to a television set via an adapter. Likewise, if, for example, the external apparatus is a personal computer, it is possible to realise a graphical processing after which the picture can be taken back to the telephone set to be transmitted over the telephone line.

These and other aspects of the invention will be apparent from and elucidated with reference to the embodiments described hereinafter.

DESCRIPTION OF PREFERRED EMBODIMENTS

Figure 1:
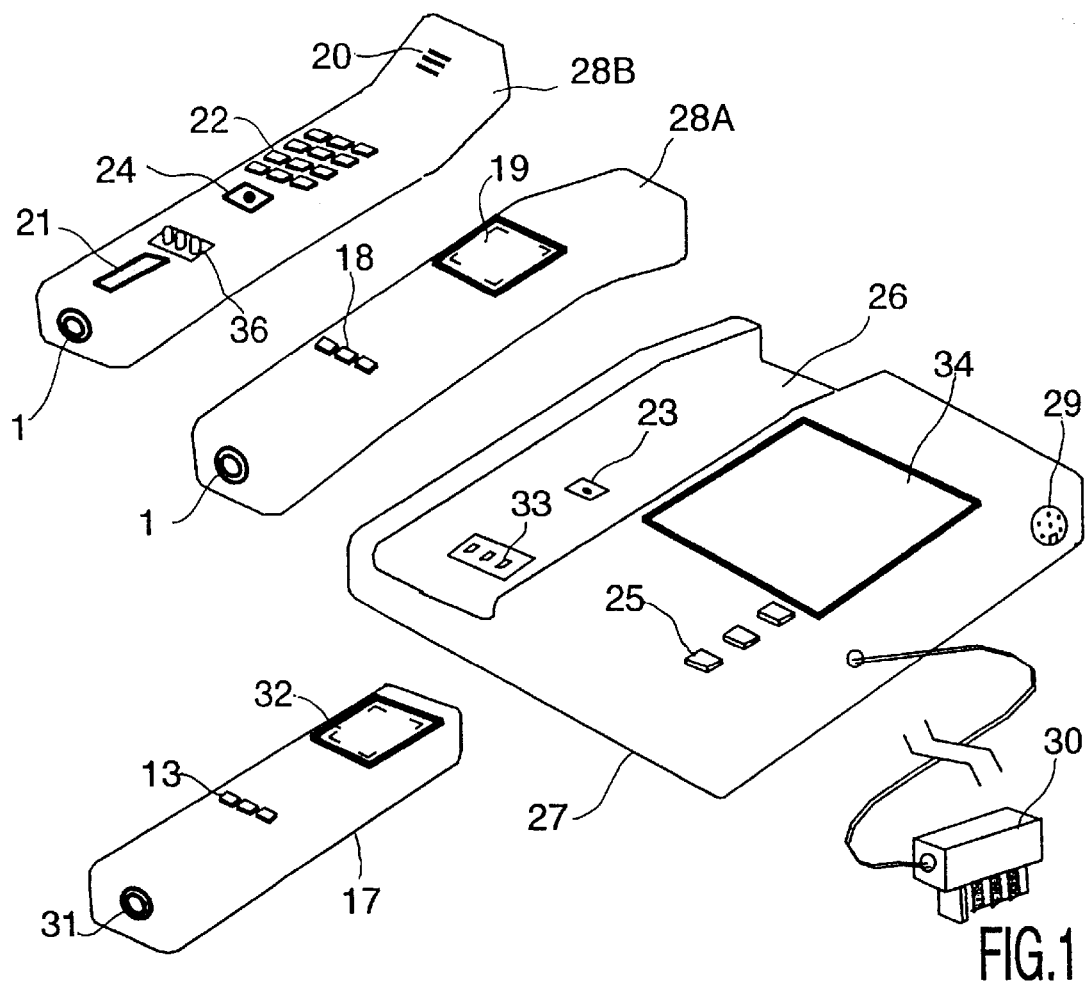
FIG. 1 is a perspective view of a telephone set according to the invention.

The telephone set shown in FIG. 1 is a set that can be integrated in the range of conventional telephone sets, but which furthermore permits the picking up, displaying and storage of still pictures. It comprises:

a semi-fixed part 27, called base, for transmitting/receiving signals, intended to be connected to a telephone line by a male connector 30 suitable for plugging into a normalized female connector (not shown). This base 27 also usually contains a line interrupter (cradle switch), a call bell, a power supply, and so on, and a detachable part 28, called handset, comprising components for speech processing (more specifically: microphone, earphone) which are electrically connected to the base 27 to be finally connected to the telephone line Wa this base. The link between the handset and the base may be formed by a radio link in a manner known in cordless telephones, or quite simply by a traditional electrical cord (not shown); the Figure displaying the case of a cordless link.

In known manner the detachable part is fed by a battery 14 which is recharged when the detachable part is put on the base, by means of a power supply situated in the base and connected to the mains. The charging current of the battery is produced via a contact interface 33. This interface has metal-to-metal contacts which are connected to the contacts 36 of the handset 28B. The detachable part 17 has the same contacts which are invisible in the drawing Figure, because they are situated underneath part 17.

The base 27 comprises a recessed chamber 26 intended to accommodate the handset 28 when the latter is "on hook". Some keys 25 allow of carrying out known telephone functions (for example: "bis", "secret", "abbreviated numbers", etc.).

In the drawing Figure, the handset 28 is represented twice: under reference 28A it is represented in a manner in which it can be directly put in the recess 26 of base 27, and under reference 28B it is represented in the opposite direction to the position referenced 28A.

The handset contains a microphone placed behind a grid 20, and an earphone placed behind a grid 21. It has a key pad 22 for dialling. This key pad could also be located on the base.

The telephone set further includes a picture sensing element installed in a part of the telephone set that can be detached from the base.

In a first embodiment this sensing element is integrated with the handset 28 which thus plays the role of "detachable part" containing a sensing element.

In a second embodiment the sensing element is installed in a specific casing which is more like a traditional handset. Such a casing is represented in 17. This casing 17 can be put down in a second recess of the base (not shown for clarity of the drawing Figure), which is analogous to recess 26 and whose position as well as dimensions can easily be determined by a person skilled in the art.

The casing 17 (or 28) includes a sensing element which comprises an objective 31 (or 1) behind which is placed inside the handset 17 (or 28) a photodiode matrix, for example, a matrix called CCD, all this forming a picture sensing element which produces a picture signal by way of television scanning. The volume of the ensemble of objective-matrix is several cubic centimeters. The matrix CCD is, for example, a model of 582×512 pixels. One side of the handset 17 (or 28a) contains a viewfinder or display screen 32 (or 19) which makes it possible to display the picture picked up by the sensing element. A silk-screen printed frame on the window of the viewfinder makes it possible to determine the picture shot. The use of the handset as a picture sensing element is like that of a photo camera. The handset includes a still-picture memory that allows of storage of several pictures, for example, ten pictures, organized in ten pages of 64 kbytes each. Storing a picture shot at a given instant can be controlled by the user by means of one of the control buttons 13 (or 18) which are accessible on the side of the viewfinder. It corresponds to a picture taken with a photo camera.

The base 27 furthermore includes a larger display screen 34 which has also a higher definition than that of the viewfinder, which makes it possible to see the details of a picture better. The base includes means for storing a picture coming from the detachable part and displaying the picture on its screen. In practice, the base has several pages of memory for recording various still pictures taken by the detachable part that has a picture sensing element, and means for taking a still picture selected by the user from its memory and for displaying and/or transmitting same over the telephone line. Several of the buttons 25 can be used for controlling these operations. All above means can easily be created by a person skilled in the art when he knows the definition of their function.

Figure 2:
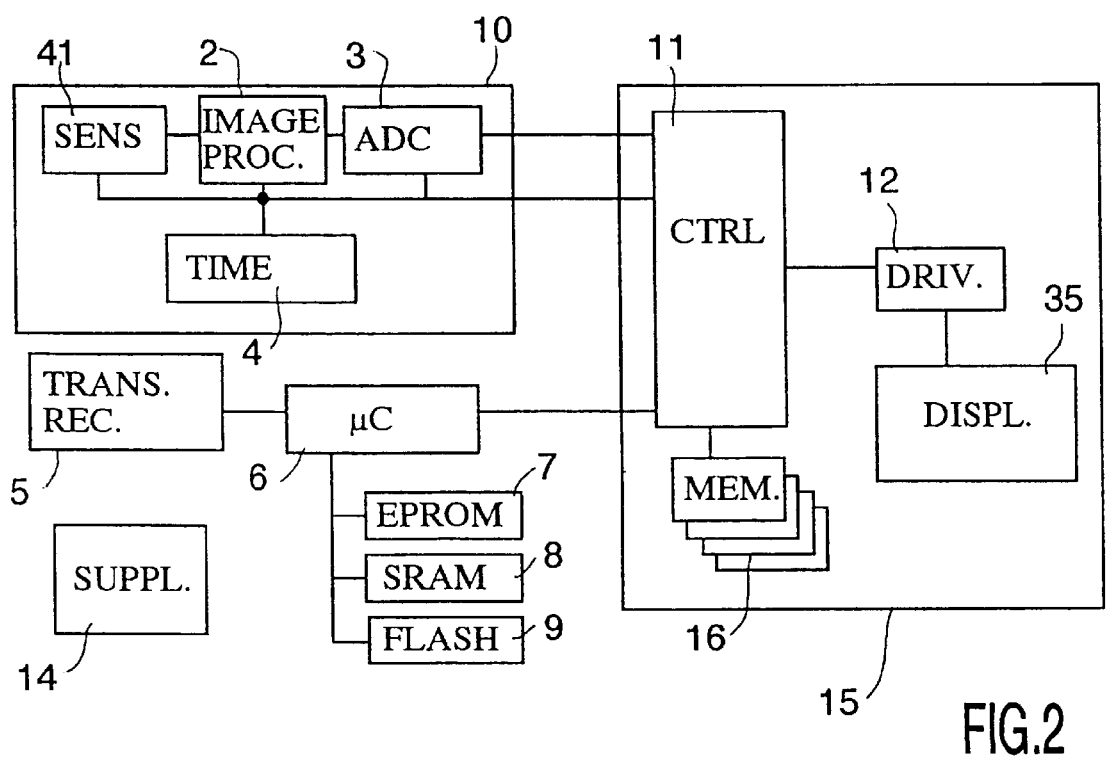
FIG. 2 is a block circuit diagram showing circuit elements used for implementing the invention.

In FIG. 2 the electronic circuits of the detachable part (handset or specific casing) which are intended for the shots particularly include a sensing element 10, display means 15, and infrared transmission means 5.

The sensing element 10 includes, like a small television camera, a sensor 41 formed by an objective already mentioned under reference 1 or 31, behind which a CCD matrix is positioned. The sensor supplies a picture signal to a picture processing circuit 2 which comprises a sample-and-hold circuit for storing the information pixel between two successive pixels, a gain control circuit, and a current controller which controls the current of the photodiodes as a function of the brightness, while this picture processing circuit applies an analog signal to a converter 3 which converts this analog signal into a digital video signal of, for example, four bits. A timing generator 4 supplies various clock signals to these circuits. One can imagine the further use of a picture compression circuit of the type known under the name of "JPEG" or "ADPCM".

The display means 15 situated in the detachable part comprise particularly a display controller 11 of known type, which is coupled to a picture memory 16 which has a capacity to store, for example, ten pages of one picture each. The controller 11 comprises a Direct Memory Access module ("DMA") which makes it possible for the bit stream coming from the picture sensing element 10 to be written in the memory 16 in a synchronous manner, for example, at the rate of 13 pictures per second (each picture replacing the previous one). A display controller 12 controls a liquid crystal display 35 which corresponds to the viewfinder 19 or 32 mentioned above. This display controller generally displays a still picture fetched from the current memory page of the picture memory, but it can also display on request other pages stored in the memory.

This system thus makes it possible to show on the display 35 the picture picked up by the sensor; the display behaves like a viewfinder of a photo camera. The user can stop the writing in the current picture memory, which then causes a still picture to appear on the screen. He can also give the order that the current picture is written on another page, which means that the previous still picture is maintained.

An infrared high-rate transmission 5 is provided for sending a picture from the detachable part to the base. The bits of a picture are serially read from the picture memory 16 and transmitted in a known serial transmission mode by a light-emitting diode in the detachable part; a receiving diode in the base receives the signal. The emitting diode is shown in 24 in FIG. 1, and the receiving diode in 23, in the recess 26. Thus, when the detachable part 28 is put on the base, the diodes 23 and 24 are facing each other. The same occurs in the case of the detachable part 17. Evidently, metal-to-metal contacts between the detachable part and the base (of the type of contacts 36 used for charging the battery) could in a simpler manner also be used for transmitting picture data in a known serial transmission mode. The pictures to be transmitted from the detachable part to the base could, as a variant, also be transmitted in known manner by a radio link.

The transfer of a picture from the memory is controlled by a user by means of one of the control buttons 18 or 13 which are accessible on the top of the handset 28 or detachable part 17, when either one is put on the base.

A logical processor 6 manages all the functions of the detachable part including the infrared transmission in association with its own memories 7, 8, 9.

The base has its own logic controller for managing its own functions. This controller comprises several different picture transmitter means each of them known per se. It comprises, for example, means for compressing the picture (if the picture has not already been compressed by the detachable part which includes the sensing element) and for transmitting the picture in this form to another telephone set of the same type. It also comprises means similar to those which are present in facsimile telephone transmitters commonly known as FAX or telecopiers and of which the procedure is standardized. To this effect the pictures are analyzed in successive lines and the picture is transmitted to a standard telecopier receiver during a normal telephone call. Each of these means can be used for transmitting a picture received either directly from the handset or from the base memory.

Of course, the controller of the base also includes several means for receiving a picture, each of the means being known per se. For instance, it comprises means for receiving a compressed picture from another apparatus of the same type, for storing the picture, decompressing it and displaying it on display 34. The controller also includes means, similar to those which are present in facsimile telephone receivers, for receiving a standardized facsimile picture, and means for converting the picture into its own coding system, for storing the picture and/or for displaying it.

The base furthermore includes a connector 29 and means for applying a picture signal to one or various pins of this connector, which pins can be connected to a local peripheral unit known per se, for example, a printer, due to which the pictures seized by the sensing element can be printed on the spot. One or various pins of this connector can also receive a picture signal coming from a peripheral unit to be written in the base memory where it can be reread in order to be transmitted over the telephone line.

What is claimed is:

1. A telephone set comprising:

a part intended for transmitting/receiving signals, connected to a telephone line, including means for transmitting a picture over the telephone line;

one or more detachable parts, which collectively include a picture sensor, a microphone and an earphone, and which collectively communicate with the part connected to the telephone line;

wherein:

the detachable part including the picture sensor comprises a converter for digitizing a picture signal coming from the picture sensor and a picture memory for locally storing at least one complete digitized picture, and the part connected to the telephone line has a specialized link to the detachable part which includes the picture sensor for the delayed transmission of a still picture from the detachable part which includes the picture sensor to the part connected to the telephone line, a screen and means for storing and displaying on this screen a still picture extracted via said special link from the picture memory of the detachable part which includes the picture sensor, and means for transmitting such a still picture over the telephone line.

2. The telephone set as claimed in claim 1, wherein the picture memory of the detachable part which includes the picture sensor has a capacity of several pictures.

3. The telephone set as claimed in claim 2, further comprising means for selecting a picture from various pictures in the picture memory of the detachable part which includes the picture sensor.

4. The telephone s et as claimed in claim 1, wherein the part connected to the telephone line comprises means for transmitting over the telephone line a picture coming from the detachable part which includes the picture sensor in the standard form of a facsimile message.

5. The telephone set as claimed in claim 1, wherein the part connected to the telephone line includes means for storing and displaying on its screen a still picture extracted via the telephone line from the picture memory of the detachable part which includes the picture sensor of another telephone set of the same type.

6. The telephone set as claimed in claim 1, wherein the detachable part which includes the picture sensor includes a display screen which displays in real time the picture picked up by the sensor.

7. The telephone set as claimed in claim 1, wherein the part which includes the picture sensor has a viewfinder and means for displaying thereon a stored picture.

8. The telephone set as claimed in claim 1, wherein the detachable part which includes the picture sensor and the part connected to the telephone line both have a display screen, and the display screen of the part connected to the telephone line has a higher definition.

9. The telephone set as claimed in claim 1, further comprising means, in addition to the telephone line, for transmitting a still picture from the detachable part which includes the picture sensor to an external apparatus.

10. A telephone set, comprising:

a base part for connection to a telephone line for transmitting and receiving signals;

a handset part detachable from the base part, the handset part communicating with the base part and having a microphone and earphone for voice communication;

a digital photo camera in the handset part for taking digital photographs and storing digital photographs;

a display screen or viewfinder in the handset part for displaying digital photograhs taken by the digital photo camera; and means for communicating digital photographs from the digital photo camera to the base part.

11. Telephone apparatus, comprising:

a portable handset having a battery, a microphone, an earphone and a transmitter for wireless voice communication with a receiver;

a digital photo camera in the portable handset for taking and storing a digital photograph;

a display screen or viewfinder in the portable handset for displaying digital photograhs taken by the digital photo camera; and means in the portable handset for communicating the digital photograph from the digital photo camera to the transmitter for wireless communication of the digital photograph to the receiver.

* * * * *